United States Patent

Haas et al.

[15] 3,671,873

[45] June 20, 1972

[54] CIRCUIT ARRANGEMENT FOR GENERATION TIMING PULSES

[72] Inventors: Guenther Haas; Dieter Reinhardt, both of Munich, Germany

[73] Assignee: Siemens Aktiengesellschaft, Berlin and Munich, Germany

[22] Filed: March 15, 1971

[21] Appl. No.: 124,124

[30] Foreign Application Priority Data

March 23, 1970 Germany ......................P 20 13 880.1

[52] U.S. Cl. ........................328/63, 178/69.5 R, 179/15 BS, 307/269, 328/72, 328/179

[51] Int. Cl. ........................................H03k 1/00, H03k 5/00

[58] Field of Search ..............307/269, 208; 328/63, 72, 179; 178/69.5 R; 179/15 BS; 340/174.1 A; 325/323, 325

[56] References Cited

UNITED STATES PATENTS

| | | | |
|---|---|---|---|
| 3,566,280 | 2/1971 | Emmons et al. | 328/63 |
| 3,597,552 | 8/1971 | Goto | 179/15 BS |

*Primary Examiner*—Stanley D. Miller, Jr.
*Attorney*—Hill, Sherman, Meroni, Gross & Simpson

[57] ABSTRACT

A circuit arrangement for generating timing pulses for a receiver system constantly synchronized with transmission impulses of a transmitter system wherein a counter is operated by pulse generator and delivers to a memory the pulse count upon receipt of a transmission pulse. The counter has adjustable initial and final count values, the final count value being determined by means which compute the deviation of the momentary value from a predetermined count value and a comparison circuit for generating the receiver timing pulse and utilizing the same to reset the counter. An initial value computer is also utilized in one embodiment for adjusting the initial count value of the counter in accordance with the output of the memory.

12 Claims, 8 Drawing Figures

INVENTORS
Guenther Haass
Dieter Reinhardt

BY Hill, Sherman, Meroni, Gross & Simpson ATTYS.

INVENTORS
Guenther Haass
Dieter Reinhardt

BY Hill, Sherman, Meroni, Gross & Simpson ATTYS.

INVENTORS
Guenther Haass
Dieter Reinhardt

BY Hill, Sherman, Meroni, Gross & Simpson ATTYS.

INVENTORS
Guenther Haass
Dieter Reinhardt

BY Hill, Sherman, Meroni, Gross & Simpson ATTYS.

INVENTORS
Guenther Haass
Dieter Reinhardt

BY Hill, Sherman, Meroni, Gross & Simpson ATTYS.

CIRCUIT ARRANGEMENT FOR GENERATION TIMING PULSES

BACKGROUND OF THE INVENTION

1. Field of the Invention

This invention relates to a circuit arrangement for generating timing pulses for a receiver system wherein the timing pulses are constantly synchronized with transmission pulses received from a transmitter system.

2. Description of the Prior Art

In transmitting data from a transmitter system to a receiver system, generally the timing of the receiver system must be synchronized with the timing of the transmitter system. A problem, therefore, arises when the receiver receives incomplete transmitter timing pulses due to transmission parameters which are variable in time, with frequency variable in time, or due to other interferences. Depending on their properties, the interferences may lead to individual or clustered failures of transmission pulses at the point of reception. In addition, interference pulses between the pulse of the transmitter must be eliminated or ignored.

A magnetic tape system wherein the data are recorded in a directional timed writing may be considered as an example for a data transmission system where the above-cited problems occur. In reading the written message it is necessary to separate the main flux changes from the redundant auxiliary flux changes. A timing pulse is generated in this respect at times when a reading signal corresponding to the principal flux or flow changes occur. In order to prevent timing pulse and reading signals from falling out of phase, the timing signals must be synchronized at all times with the reading signals. Such falling out of phase is possible when the reading signals carry out frequency shifts in response to a change of the information recorded, when phase shifts occur as a result of an information-dependent peak shift of the reading signals or when frequency modulations occur which are caused by tape speed fluctuations. Moreover, after a transfer interval the timing pulses must be synchronized rapidly to the reading signals arriving as blocks (phasing-in), and in case of short-time reading signal drop outs the timing pulses must continue to be generated so that at the end of a drop out synchronization again is established in accordance with the symbol.

The circuit arrangement for generating timing pulse in receiver system must, therefore, meet various requirements.

1. In case of frequency fluctuations of the transmitter system the circuit arrangement must be able to follow such fluctuations within a certain range (entrainment behavior).

2. In the case of a drop out of one or several transmission pulses the circuit arrangement must maintain the frequency it last possessed (holding behavior).

3. Slight fluctuations of the transmission pulses about their time-wise theoretical position shall remain disregarded for the generation of the timing pulses.

4. Following an interruption of transmission the circuit arrangement shall be resynchronized as rapidly as possible to the transmission pulses (phase-in conduct).

Circuits are known in the prior art which meet the foregoing requirements to a large extent. As a rule these circuits are constructed from a phase detector and a voltage-controlled oscillator. See Electronic Design 8, Apr. 11, 1968, pages 76 and following, and Electronic Design 10, May 9, 1968, pages 90 and following. These are analogous circuits. The disadvantage of these analogous circuits resides in the dependency on building component tolerances, conditions of the environments and supply voltages. Moreover, these circuits frequently include trimming elements which must be adjusted justed and it is often very difficult to convert them to other transmission frequencies.

SUMMARY OF THE INVENTION

The primary objective of the present invention resides in the problem of obviating the disadvantages of the aforementioned analogous circuits and in offering a circuit arrangement utilizing digital techniques which meet the requirements stated above. According to the invention, the circuit arrangement comprises a control circuit, a counter whose start and finish values are adjustable and which counts pulses furnished by a pulse generator, a memory to which the contents of the counter is supplied in response to receipt of a transmission pulse from a transmitter system, a final value computer which computes the final value of the counter as a function of the deviation of the momentary value of the counter from a predetermined count value, and a comparison circuit which delivers an output timing signal in response to an equality of the contents of the final value computer and the counter. The output signal is utilized to reset the counter to its starting value, as well as being utilized for the timing signal of the receiver system.

A circuit arrangement constructed in accordance with the principles of the present invention can advantageously be built entirely from integrated digital construction elements now commercially available in the trade.

The frequency of the counting pulses supplied to the counter must be higher than the frequency of the transmission pulses. It is particularly favorable for the frequency of the counting pulses to be higher by an integral power of 2 than the theoretic value of the transmission frequency, as then the final values of the counter can be selected in a particularly simple manner with the aid of digital construction elements.

The initial value of the counter may be selected to be constant. However, such a selection brings forth the disadvantage that at permanent off position of the frequency of the transmission pulses, with respect to the frequency of the counting pulses, the phase position between the transmission pulses and the timing pulses in the receiver system (receiver timing pulses) changes with respect to the normal case. Under normal conditions, that is, when the frequencies of the counting pulses and the transmission pulses are in the predetermined reciprocal relation, the transmission pulses are always time-wise in the center between two receiver timing pulses. To avoid this disadvantage, it is also possible to compute the initial value of the counter in accordance with the deviation of the momentary count value from a predetermined value by means of an initial value computer. According to this deviation from the above, both the initial and final values of the counter then change.

The control circuit immediately responds to any change of frequency and phase of the transmission pulses. This reaction may not be desired in certain cases because the control of the circuit then responds to any short fluctuation of the transmission pulses about their theoretical positions. By introducing a smoothing member it is possible for the control circuit to respond only to phase off positions which occur at least during the smoothing time and which generally originate from frequency deviations.

BRIEF DESCRIPTION OF THE DRAWINGS

Other objects, features and advantages of the invention, its organization, construction and operation, will best be understood from the following detailed description of certain exemplary embodiments thereof taken in conjunction with the accompanying drawings, in which.

DESCRIPTION OF THE PREFERRED EMBODIMENTS

Figure 1:
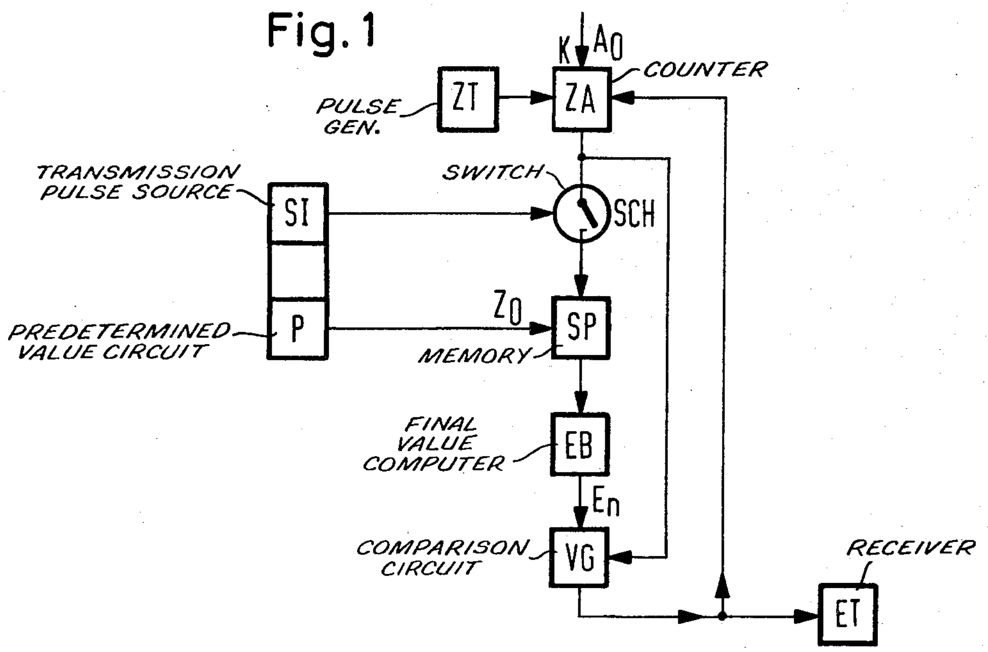
FIG. 1 is a block circuit diagram of a control circuit according to the present invention.

FIG. 1 exemplifies an embodiment of the control circuit of the present invention. A pulse generator ZT supplies counting pulses to a counter ZA. The counter ZA is connected by way of a switch SCH to a memory SP. The switch SCH is opened and closed by the transmission impulses SI received from a transmitter system. The memory SP is provided with a predetermined value $Z_O$ from a circuit P. The output of the memory SP is connected to a final value computer EB, in which the final value of the counter is computed from the predetermined value $Z_O$ as a function of the deviation of the count furnished by way of the switch SCH to the memory SP. This final value is the value to which the counter ZA shall count. The contents of the final value computer EB and of the counter ZA are compared in a comparison circuit VG. When there is an equality of these contents, the comparison circuit VG delivers a pulse. This pulse constitutes the receiving system timing pulse and is fed also to a reset input of the counter ZA to reset the counter ZA to its initial counting value $A_O$. The intial value $A_O$ can be supplied to the counter ZA at the input K and in this case is a fixed value.

The control circuit basically operates as follows: The counter ZA is counted up with the counting pulses of the pulse generator ZT from the determined intial value $A_O$. Upon receipt of a transmission pulse SI, the switch SCH is closed and the momentary value of the counter ZA is recorded as $Z_N$ (counter position at the arrival of the N-th transmission pulse) into the memory SP. A final counter value $E_N$ is computed from the memory contents in the final value computer EB and compared in the comparison circuit VG with the corresponding position of the counter ZA. If the counter ZA, which continues to receive the counting pulses from the generator ZT, attains this final value $E_N$, a pulse is delivered by the comparison circuit VG which resets the counter ZA to its initial value $A_O$ again and represents at the same time the receiver timing pulse. The counting timing frequency is thereby selected sufficiently large in relation to the transmission pulse frequency and it remains constant.

Figure 2:
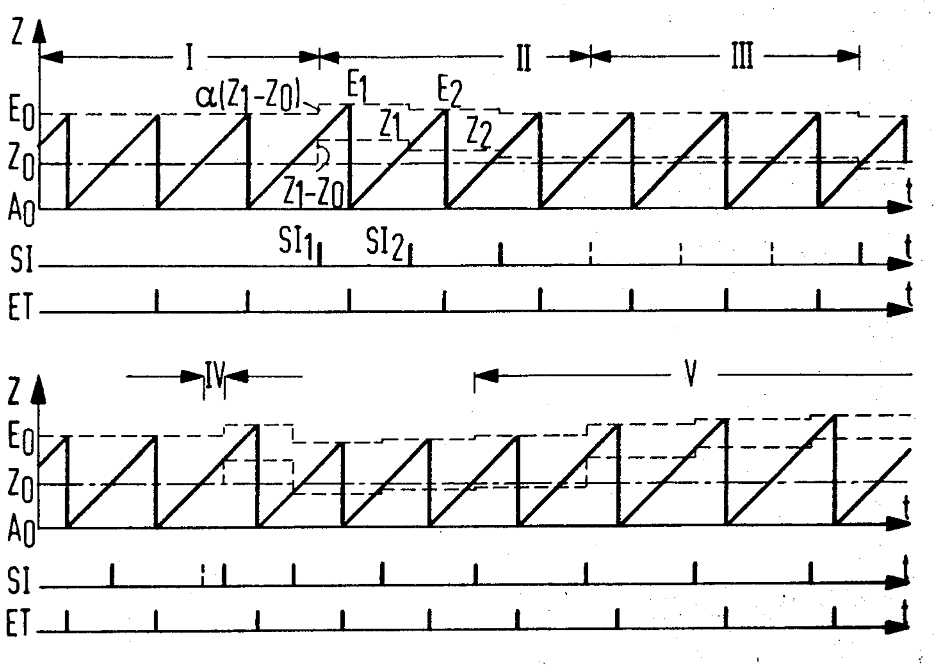
FIG. 2 is a graphical illustration of the signal images of the control circuit illustrated in FIG. 1.

The manner of operation of the control circuit can be seen in greater detail by reference to FIG. 2. Here the position of the counter ZA is shown plotted above the time $t$. The resulting curve of the positions of the counter may be interpreted as a digitalized saw tooth oscillation whose period is determined by the computed final value and thus by the position of the counter upon the arrival of a transmission pulse SI.

During the transmission interval (range I of FIG. 2) a predetermined value $Z_O$ is recorded into the memory SP, causing the frequency of the saw tooth oscillation to be equal to the theoretical transmission frequency. When the counting timing frequency is $N_O$ times the theoretical transmission frequency, the counter ZA is permanently counted up during the transmission interval from the initial value $A_O$ to the final value $E_O$ and then again reset to the initial value $A_O$. The initial value $A_O$ and the final value $E_O$ are so determined that they are positioned symmetrically with respect to the predetermined value $Z_O$. These values result from the expressions:

$$A_O = Z_O - \frac{N_O}{2} \quad (1)$$

$$E_O = Z_O + \frac{N_O}{2} \quad (2)$$

The receiver timing pulses ET are represented in the third line of FIG. 2. These pulses are always present when the counter ZA is reset to its initial value. The transmission pulses SI may be seen on the second line of FIG. 2.

When the tranmission pulses SI are present, the phasing in of the receiving pulse times ET upon the transmission pulses SI starts (range II of FIG. 2). The first transmission pulse $SI_1$ is received when the counter ZA is at any position $Z_1$ between $A_O$ and $E_O$. This value $Z_1$ is now recorded in the memory SP. The final counter value $E_1$ is calculated from the deviation $Z_1 - Z_O$ (deviation according to rule) in the final value computer EB. In FIG. 2, the final value $Z_1$ is greater than the predetermined value $Z_O$.

The control circuit according to FIG. 1 is so designed that it has proportional behavior. The adjustment value $E_1 - E_O$ is then in proportion with the rule deviation $Z_1 - Z_O$. The new final value the counter may reach is, therefore, found in accordance with the expression $$E_N = E_O + \alpha (Z_1 - Z_O) \quad (3)$$

i.e. it is formed in the final value computer EB. Alpha is a factor of proportionality representing the amplification of the control circuit. It must be so selected that the control circuit is sufficiently stable and can be phased in rapidly. Moreover, it is quantized binarily preferably so that it can be determined by the circuit wiring, for a binary multiplication or division can be shown by shifting the binary number to the left or right, respectively. In the embodiment of FIG. 2, the selection is alpha = ½.

When the counter ZA has reached the final value $E_1$, it is again reset to the initial value $A_O$, and counted up again. With the next transmission pulse SI the counting position $Z_2$ is transferred into the memory SP, and the new final $E_2$ is calculated according to the same mathematical rule, and so on upon receipt of each transmission pulse SI. The phase-in process is completed after a few transmission pulses SI and at the theoretical frequency of the transmission pulses SI the latter then are exactly time-wise in the middle between the receiver timing pulses ET.

In the embodiment of FIG. 2, the regular deviation $Z_1 - Z_O$, moreover, the amplified regular deviation $\alpha (Z_1 - Z_O)$ and the final values $E_1$, $E_2$ are shown. This illustrates that the regular or control deviation $Z_N - Z_O$ becomes smaller and smaller so that the final values $E_1$, $E_2$ also become smaller and gradually approach the value $E_O$.

Range III of FIG. 2 shows conditions at signal drop out. In the absence of one or more transmission pulses SI the content of the memory SP is not varied. The saw tooth oscillation thus continues to oscillate at the last frequency until a transmission pulse SI arrives again and changes the content of the memory.

In area IV of FIG. 2 there is illustrated a phase shift of the transmission pulse SI. Because the phase deviation is positive, the control deviation $Z_N - Z_O$ is also positive and the calculated final value is larger than the final value $E_O$. Because, however, the next transmission pulse SI arrives earlier in relation to the preceding transmission pulse, the control deviation becomes negative, and the final value is below the value $E_O$. Such unique phase shifts of the transmission pulses are likewise regulated with a few steps.

The relations or conditions are shown in area V of FIG. 2 which prevail when the frequency of the transmission pulses varies. Such a frequency shift causes a permanent control deviation. The receiver timing pulses ET are then located after the initial vibration process by an amount proportional to the frequency shift adjacent the center between the transmission pulses SI. This amount is called residual phase error. In the example of FIG. 2, the frequency of the transmission pulses SI becomes greater, then the finish values E rise until they have reached a stable value. The receiver timing pulses ET shift in the direction toward the corresponding transmission pulses.

This residual phase error can be reduced by changing both the terminal value $E_N$ and the initial value of the counter ZA as a function of the momentary value $Z_N$ with an auxiliary adjustment value. The auxiliary adjustment value is taken from the control circuit itself and generated from the control deviation $Z_N - Z_O$ by multiplication with a second amplification factor. The residual phase error disappears completely when the second amplification factor is selected in accordance with the expression $$\beta = 1 - (\alpha/2) \quad (4)$$

Then the instruction for the calculation of the terminal and initial values for the counter appear as:

$$E_N = E_O + \alpha(Z_N - Z_O) + \beta(Z_N - Z_O) \quad (5)$$

$$A_{N+1} = A_O + \beta(Z_N - Z_O) \quad (6)$$

If the ratio of the counting timing frequency to the transmission pulse frequency is selected as $$N_O = \alpha \cdot Z_O \qquad (7)$$

a conversion with the utilization of expressions (1), (2), (4), (5), (6) and (7) will produce $$E_N = \left(1+\frac{\alpha}{2}\right) \cdot Z_N = Z_N + Z_N \cdot \frac{\alpha}{2} \qquad (5b)$$

$$A_{N+1} = \left(1-\frac{\alpha}{2}\right) \cdot Z_N = Z_N - Z_N \cdot \frac{\alpha}{2} \qquad (6b)$$

The initial and final values are therefore, placed with the distance $Z_N \times (\alpha/2)$ symmetrically about the counter position $Z_N$. The transmission pulses SI are, therefore, always placed after the phasing in process in the center between the receiver timing pulses ET. Moreover, the values can be calculated in a very simple manner with binarily quantized alpha according to the above rule.

Figure 3:
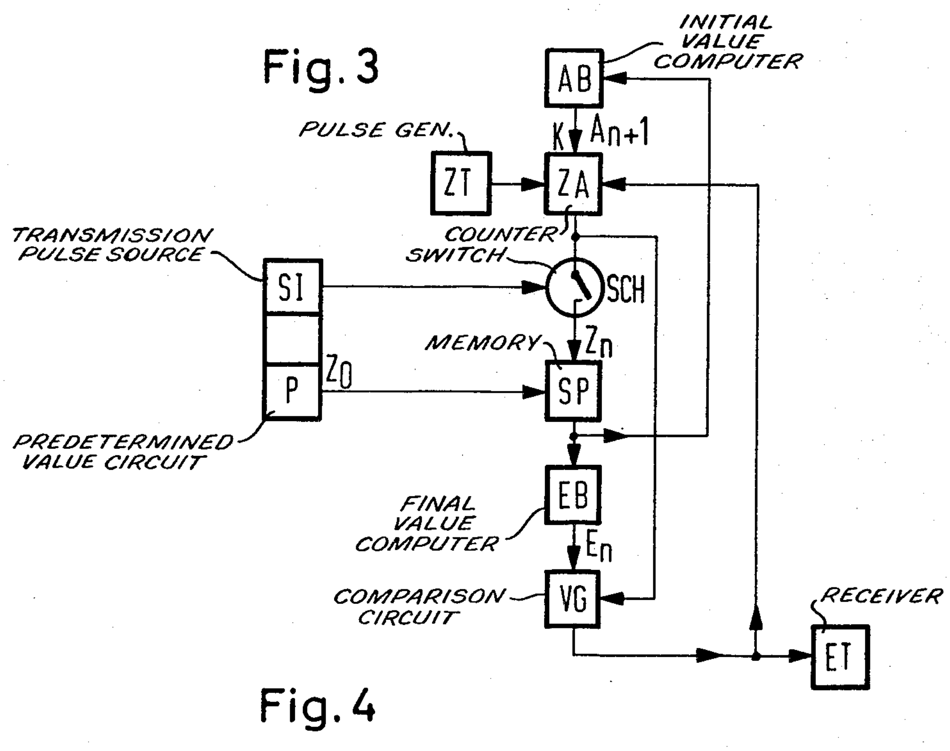
FIG. 3 is another block circuit diagram illustration of an embodiment of the invention.

The manner of operation of the control circuit of FIG. 3 is similar to that of the control circuit of FIG. 1, the only difference being that the final value $E_N$ is produced according to another mathematical instruction and that in addition the initial value $A_{N+1}$ is changed. In addition to the embodiment according to FIG. 1, an initial value computer AB is utilized in FIG. 3 and connected between the output of the memory SP and the input K of the counter ZA. The initial value is, therefore, computed as a function of the contents of the memory SP and is available immediately after arrival of a transmission pulse SI, like the final value $E_N$.

Figure 4:
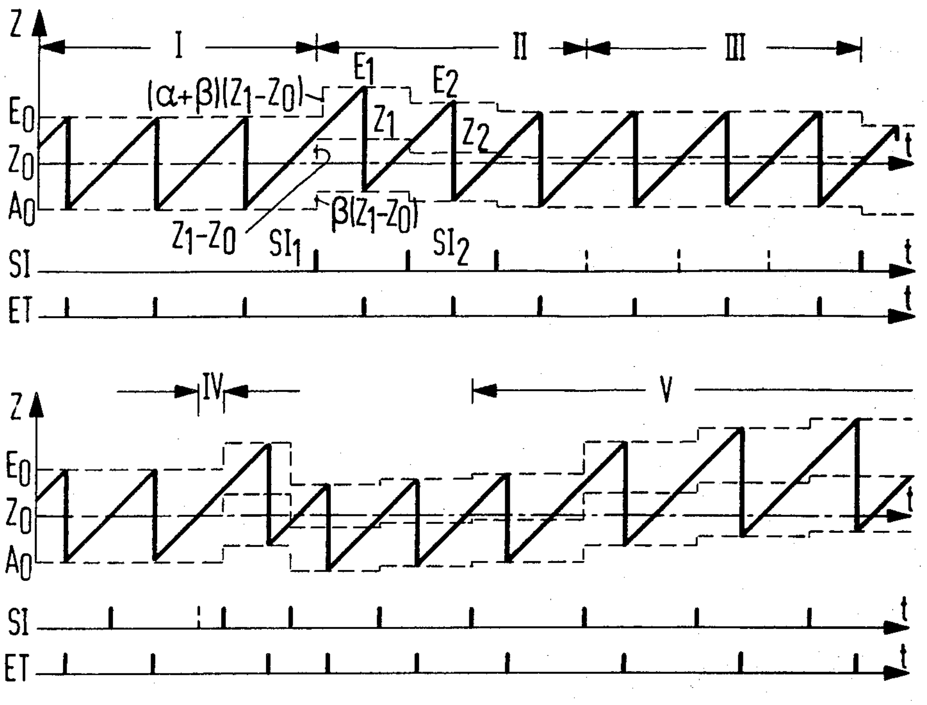
FIG. 4 is a graphical illustration of signal images of the control circuit illustrated in FIG. 3.

FIG. 4 illustrates in a manner similar to that of FIG. 2, the curve for the embodiment of FIG. 3. The phase-in and holding behavior is comparable with that of the embodiment of FIG. 1. The area I is again the range of the transmission interval. Here the saw tooth oscillation always oscillates between the initial value $A_O$ and the final value $E_O$ symmetrically about the predetermined value $Z_O$. In the range II transmission pulses SI occur. The new final value $E_1$ is then computed by the final value computer EB as a function of the control deviation $Z_1 - Z_O$. The same applies to the initial value $A_2$. The final value $E_1$ and the initial value $A_2$ are located symmetrically with respect to the momentary value of the counter $Z_1$. The saw tooth oscillation is, therefore, shifted as a whole upwardly or downwardly.

In the case of a signal drop out (range III) the saw tooth oscillation continues to oscillate with the preceding initial and final values. When transmission pulses reappear, the saw tooth oscillation is again synchronized with the transmission pulses SI (according to range II).

In case of a phase shift (range IV), conditions correspond to the phase-in range II. If there is a frequency change (range V), both the initial value and the final value approach new constant values, that is to say, the saw tooth oscillation is shifted either upwardly or downwardly. In any event, it is assured that following the start of the oscillation process at any desired and additional frequency position, the transmission pulses SI are always positioned precisely in the center between the receiver timing pulses ET, that is, the residual phase error disappears.

The control circuit immediately responds to any frequency or phase change of the transmission pulses. Under certain circumstances, this behavior may be undesirable, because the control circuit then responds to any brief oscillation of the transmission pulses about their theoretical positions. By introducing a smoothing member, it is possible to provide that the control circuit only responds to phase off positions which prevail at least throughout the smoothing time and which in general originate from frequency deviations.

Smoothing may be accomplished for example by a message via the counter positions at $m$ transmission pulses. Regarding both investment and effect, a smoothing proves particularly favorable which resides in an already calculated or pre-determined mean value being multiplied by the factor $m$, a mean value being subtracted from the product, and the new counter status being added thereto. The result is then divided by the factor $m$, recorded into the memory as the new mean value and utilized for calculating the initial and final values of the next mean value. The mean value is, therefore, produced according to the expression $$M_N = \frac{mM_{N-1} - M_{N-1} + Z_N}{m} = \frac{(m-1) \cdot M_{N-1} + Z_N}{m} \qquad (8)$$

Here also the structure becomes particularly simple with integrated building components when $m$ is a binary number.

Figure 5:
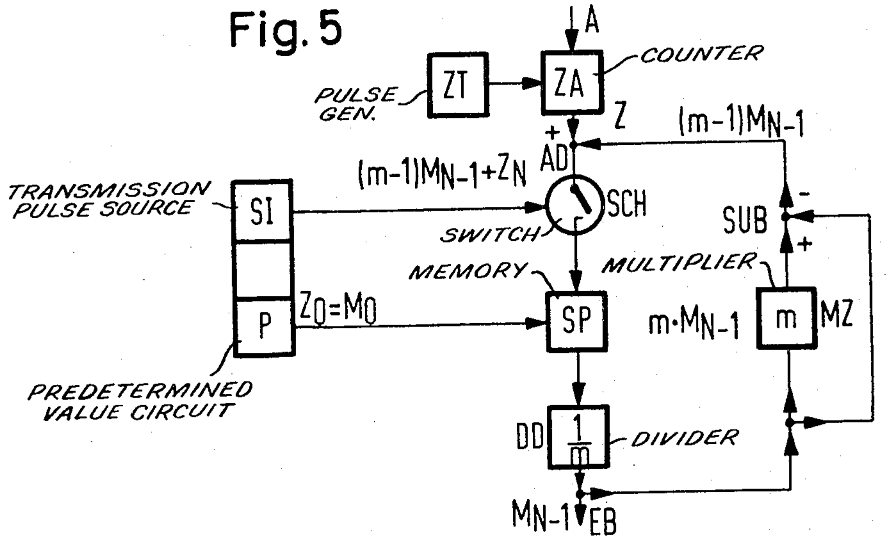
FIG. 5 is a block circuit diagram of the invention illustrating the provision of a smoothing member.

An arrangement by which the above equation is realized is represented in FIG. 5. In FIG. 5 the smoothing member is inserted within the arrangement according to FIG. 1. The building components which also are used in FIG. 1 are given the same reference characters. In the smoothing member a divider DD is located at the output of the memory SP to divide the symbol originating from the memory SP. The result shows $M_{N-1}$, for example. This result is supplied, on the one hand, to the final value computer EB, and, on the other hand, in a feedback loop to the output of the counter ZA where it is added to the count. A multiplier MZ is inserted into the feedback loop to multiply the division result $M_{N-1}$ by $m$, thus forming the product $m \times M_{N-1}$. The multiplier MZ is bridged by a conductor which carries the output of the divider DD to a subtractor SUB where it is subtracted from the output of the multiplier MZ. At the output of the subtractor SUB there then appears the value $(m-1) \times M_{N-1}$. This result is added together with the output of the counter ZA in an adder AD. At the output of the adder there then appears the result $(m-1) \times M_{N-1} + Z_N$. This value is fed to the memory SP in response to the receipt of a subsequent transmission pulse SI and from there to the divider DD. The divider delivers a result corresponding to the equation 8 above. A predetermined initial value $Z_O = M_O$ is fed into the memory SP prior to the start of the above computing operation.

Figure 6:
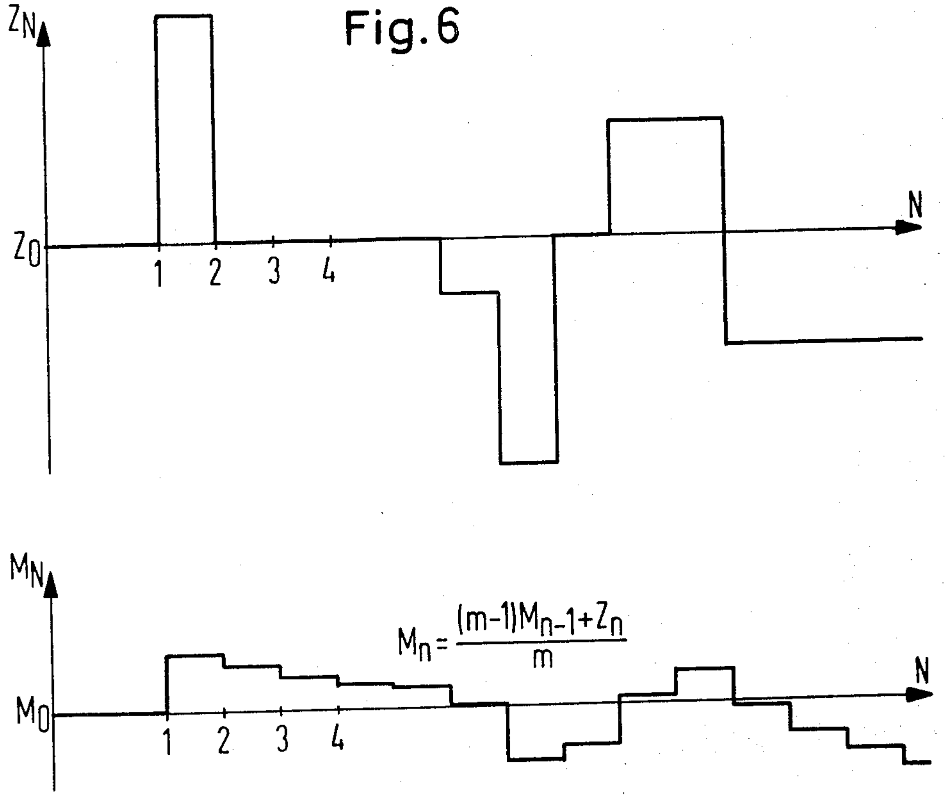
FIG. 6 is a graphical illustration of signal images of the smoothing member as applied in FIG. 5.

FIG. 6 illustrates an example of the effect of a smoothing member where $m = 4$ transmission pulse periods according to the above-mentioned method. In curve ($a$) there is shown the counting result $Z_N$ over the number N of the transmission pulses. The abscissa value is $Z_O$. A phase deviation exists, for example, between the transmission pulses 1 and 2, which means that the counting result $Z_N$ considerably differs from the value $Z_O$. The subsequent transmission pulses again arrive in the proper time sequence. If no smoothing member were inserted into the control circuit, the control circuit would respond at once very strongly to this phase deviation. The curve ($b$) illustrates the situation when a smoothing member is inserted, whereby $m = 4$ periods. Here, $M_N$ is plotted above the transmission pulses $N$. The abscissa value is $M_O$. The deviation between the momentary value $M_N$ and the predetermined value $M_O$, which is supplied to the final value computer EB, is considerably smaller than in the case of curve ($a$).

Figure 7:
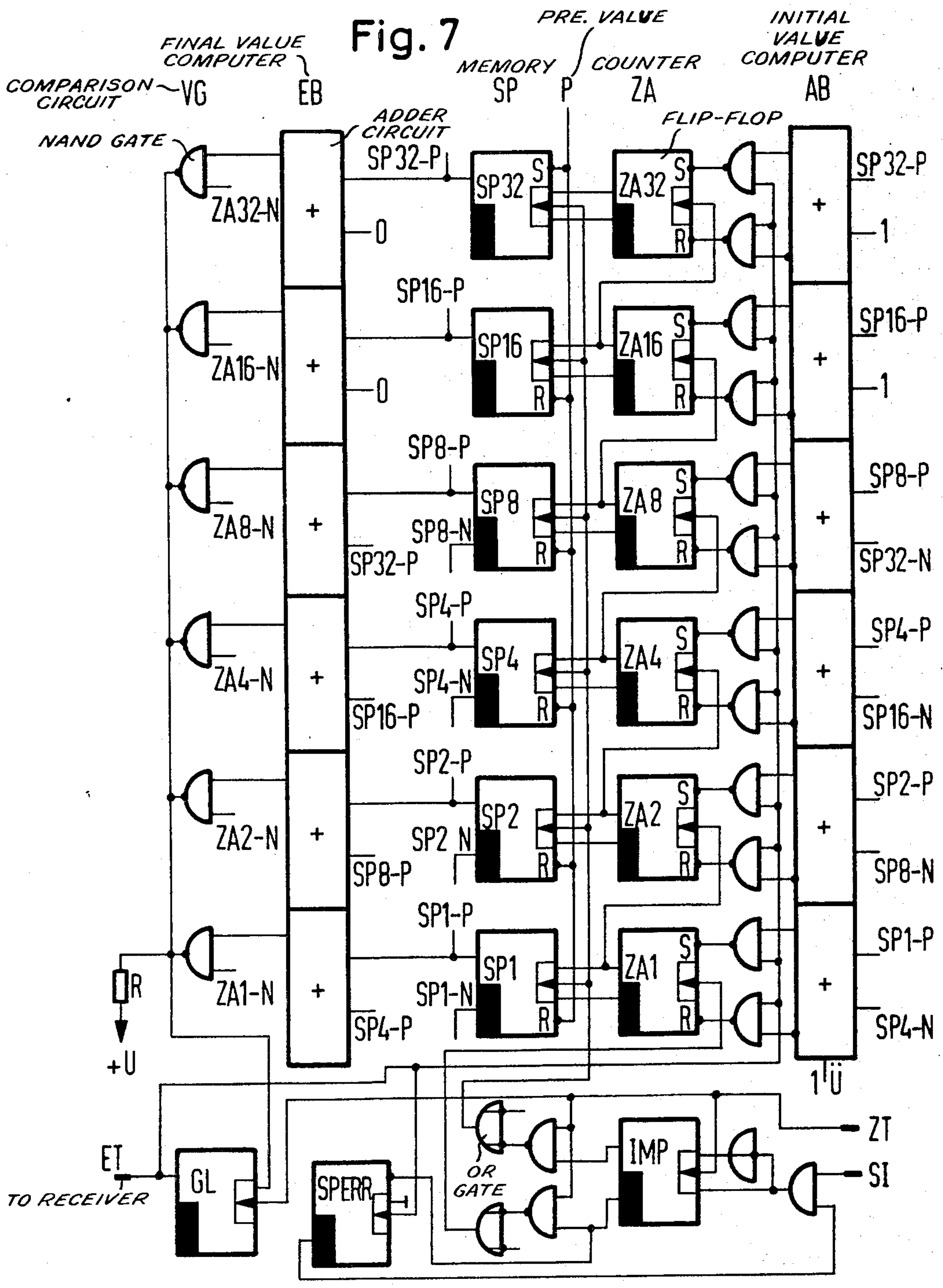
FIG. 7 is a circuit diagram of the embodiment of the invention illustrated in FIG. 3.

FIG. 7 illustrates a circuit diagram of the arrangement of FIG. 3. The identification of the circuit elements used corresponds with that of the block circuit diagram of FIG. 3. To avoid having to show in the drawing all the connections between the individual circuit elements, identical references are shown at the outputs and inputs to be interconnected.

In FIG. 7, S refers to the set inputs of bistable flip-flop circuits and R identifies the reset inputs of the bistable flip-flop circuits. The counter ZA and the memory SP comprise a plurality of bistable flip-flop circuits, the initial value computer AB and the final computer EB comprise solid state adders, well-known in the art and the comparison circuit VG comprises NAND circuits whose outputs are interconnected.

In the embodiment shown, the amplification factors are selected as $\alpha = ½$ and $\beta = ¾$. The relation of the frequencies of the counting pulses to the frequency of the signal pulses is $M_O = 16$. In order that equation (7) be met, the counter condition $Z_O = 32$ must be determined. From equations (1) and (2) a theoretical counter condition $E_O = 40$ and an initial counter value of $A_O = 24$ result. During the transmission interval the value $Z_O = 32$ is recorded with the signal P in the memory SP by setting the bistable flip-flop circuit SP 32 and by resetting all remaining bistable flip-flop circuits SP.

According to the equations (5b) and (6b), the final and initial values can be determined with the above values for $\alpha$ and $\beta$.

$$E_N = Z_N + \frac{Z_N}{4}$$

and $$A_{N+1} = Z_N - \frac{Z_N}{4}$$

The final value is computed by directly connecting the outputs of the bistable flip-flop circuits SP with the addend inputs of the six-bit solid state adder EB and by connecting the contents shifted to the right by two binary places ( thus divided by 4) with the instantaneous inputs. Thus, at the output of the adder EB the final value is available to which the counter ZA is counted up.

To compute the initial value $A_{N+1}$, the memory SP is connected to the addend inputs of an additional adder, the initial value computer AB. The contents divided by 4 are fed for subtraction to be instantaneous inputs as one complement (inverted). In addition, a 1 must be firmly applied at the adder AB as incoming forward, in order to achieve a correct subtraction. Thus, the initial value is also available to which the counter is reset after attaining the terminal value.

The outputs of the adder EB are regularly compared in the comparison circuit VG, comprising a plurality of WIRED-OR-NAND gates, with the position of the counter. If both agree, the bistable flip-flop circuit is set with the subsequent counting pulse, the receiver timing pulse ET is delivered and the counter ZA is set via the set and reset inputs of the bistable flip-flop circuits of the counter to the computed initial value. The counter ZA again is counted up to the final value, set anew, and so forth.

After the transmission interval, the first transmission pulse sets the bistable sweep circuit IMP with one counting pulse ZT. With the next counting pulse ZT the momentary counting status $Z_1$ is recorded in the memory SP. At the same time for the moment of the transfer the counter is not counted further, so that a clear counter position is transferred. In addition, the bistable flip-flop circuit SPERR is set which cuts off the transmission pulse after one pulse. As a result the control circuit becomes independent of the length of the transmission pulse, with the limitation that its length equals at least one counter timing period.

With the receiver timing pulse the bistable flip-flop circuit SPERR is reset again and the following transmission pulse is released for the computation of the final and initial values. The new values $E_N$ and $A_{N+1}$ are generated immediately after the storing of the counter position, in the same manner as the final and initial theoretical values in the final value computer EB and in the initial value computer AB, and offered to the comparison circuit VG and/or the set and reset inputs of the counter. If the counter ZA attains the new final value, it is reset to the new initial value and counted up again.

Figure 8:
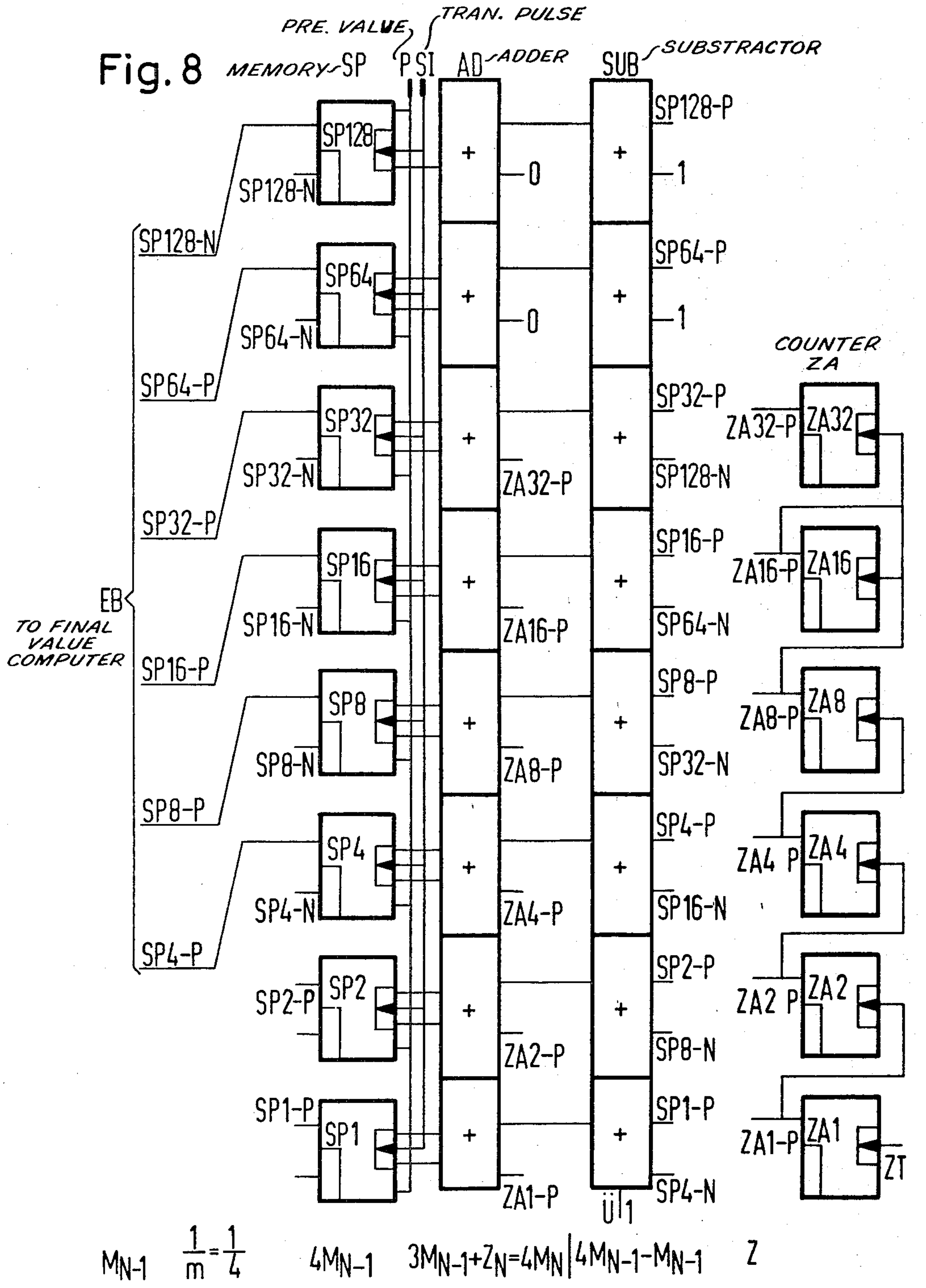
FIG. 8 is a circuit diagram of a smoothing member.

FIG. 8 illustrates a circuit diagram of a smoothing member. The centering M is accomplished by way of four transmission pulse periods. During the transmission interval the value $4 \times M_O = 128$ is entered into the memory SP. The contents of the memory SP are divided by 4 by shifting by two binary places and fed to the final value computer EB as $M_O = Z_O$. Furthermore, $M_O$ is subtracted in the eight-bit subtractor SUB from the memory contents $4 \times M_O$. The output of the subtractor SUB is connected with the addend inputs of an eight-bit adder. The other inputs of the adder are connected on the other hand to the outputs of the counter ZA. Therefore, the sum $3M_O + Z_1$ is regularly available at the output of the adder AD. With the transmission pulse SI arriving first the momentary sum is entered in the memory SP as $4 \times M_1$. The value is divided by 4 and made available to the final value computer EB as $M_1$ in the embodiment without smoothing. According to the same mathematical steps as above for the value $3M_1$ and the counter position $Z_2$ are now offered to the adder AD. With the following transmission pulse SI, the sum $3M_1 + Z_2$ is entered into the memory and the operation begins again.

The circuit arrangement according to the invention offers the following advantages:

1. It is independent of voltage fluctuations and ambient influences, providing the conditions indicated in the specifications of the construction components are complied with.

2. Without changing the circuit, it may be utilized for any transmission pulse frequency by merely switching the counting pulse frequency.

3. The arrangement is free from servicing, because it contains neither potentiometers nor compensation members.

4. In the embodiment according to FIG. 3, it is guaranteed moreover that the receiver timing pulses are placed precisely in the middle between the transmission pulses SI even at major off position of the transmission frequency, that is the residual phase error disappears.

5. The pull-in range of the control circuit becomes as large as desired.

The circuit embodiment of FIGS. 7 and 8 are merely examples of execution to which the invention is not restricted. Although we have described our invention by reference to such illustrative examples, many changes and modifications may be made in our invention by those skilled in the art without departing from the spirit and scope of the invention, and it is to be understood that we intend to include within the patent warranted hereon all such changes and modifications as may reasonaly and properly be included within the scope of our contribution to the art.

What we claim is:

1. A circuit for generating timing pulses for a receiver system constantly synchronized with transmission pulses of a transmitter system, comprising:
   - a pulse generator;
   - a counter connected to said pulse generator and having adjustable initial and final count values and operable to count the generated pulses;
   - a memory;
   - means for receiving transmission pulses operable to transfer pulse count from said counter to said memory upon receipt of a transmission pulse;
   - a final value computer connected to said memory for computing the deviation of the momentary pulse count from a predetermined final pulse count;
   - comparison means connected between said computer and said counter for generating an output timing pulse which resets said counter to its initial value upon equality between the contents of said computer and said counter.

2. The circuit of claim 1, wherein said pulse generator includes means for generating pulses to be counted at a rate of at least twice that of the transmission pulses.

3. The circuit of claim 1, wherein said receiving means includes switching means interposed between said counter and said memory and operated in response to a transmission pulse.

4. The circuit of claim 1, wherein said computer operates to compute in accordance with the expression $$E_N = E_O + \alpha(Z_N - Z_O)$$

where $E_N$ is the final count value of the counter, $E_O$ the initial count value of the counter, $\alpha$ a proportionality constant, $Z_N$ the instantaneous count value, and $Z_O$ the predetermined count value.

5. The circuit of claim 4, comprising means for establishing the initial and final values of said counter symmetrically about the predetermined count $Z_O$.

6. The circuit of claim 1, comprising an initial value computer connected to said memory and to said counter for computing and supplying to said counter the initial value as a function of the deviation of the momentary count value from the predetermined count value.

7. The circuit of claim 6, wherein said receiving means includes a switch interposed between said counter and said memory and operable to transfer the pulse count therebetween upon receipt of a transmission pulse.

8. The circuit of claim 6, wherein said computer includes means for computing the initial value in accordance with the expression $$A_{N+1} = A_O + \beta(Z_N - Z_O)$$

Where $A_O$ is the initial value, $\beta$ is a proportionality constant and $A_{N+1}$ is the new computed initial value.

9. The circuit of claim 8, wherein said final value computer includes means for computing the final value in accordance with the expression $$E_N = E_O + (\alpha + \beta)(Z_N - Z_O).$$

10. The circuit of claim 9, wherein said final value computer includes means which establishes the relationship $\beta = 1 - \alpha/2$.

11. The circuit of claim 10, comprising a smoothing member connected in said circuit for preventing minor phase deviations due to minor deviations of the transmission impulses.

12. The circuit of claim 11, wherein said smoothing member comprises a divider connected between said memory and said final value computer, a multiplier connected to said divider, a subtractor connected to said divider and to said multiplier, and an adder connected to said counter, to said subtractor and to said receiving means.

* * * * *